April 7, 1953   J. N. DAVIS   2,634,305
DEFERRED-ACTION BATTERY
Filed Nov. 23, 1948

INVENTOR.
James N. Davis
BY
*[signature]*
Attorney

Patented Apr. 7, 1953

2,634,305

UNITED STATES PATENT OFFICE 2,634,305

DEFERRED-ACTION BATTERY

James N. Davis, Elmont, N. Y., assignor to Sylvania Electric Products Inc., a corporation of Massachusetts Application November 23, 1948, Serial No. 61,571

11 Claims. (Cl. 136—90)

The present invention relates to features of construction of deferred-action batteries, in particular to highly active types as for example that employing magnesium and silver chloride, and to methods of fabrication of such batteries.

Features of the invention relate to improved safeguards against self-destruction due to atmospheric moisture; minimized internal electrical resistance; to features of construction for minimizing the battery size and for yielding excellent resistance to mechanical shock and vibration; and to simplicity in preparing the stored battery for activation and use.

Particularly for application to highly active cells such as the magnesium-silver chloride cell, the invention provides new physical forms of electrodes and electrode assemblies. In prior-art batteries employing magnesium and silver chloride as the chemically active materials, a magnesium foil and a silver foil were joined together at one edge but were insulated from each other over most of their back-to-back area, and the exposed face of the silver foil was chemically or mechanically coated with silver chloride in powder form. Because of shock and vibration, the performance of such a cell is likely to suffer due to loosening of the silver chloride from the silver foil. One feature of the present invention resides in the provision of silver chloride that is fused and mechanically reduced to wafer form, as by rolling, in place of the chloride-coated silver foil. Fused silver chloride has high electrical resistivity, but can be made highly conductive by means of an intimately bonded metallic surface, advantageously in the form of conductive paint that is free of electrolyte. Conductive paint has the further merit of excluding atmospheric moisture and thus inhibits destructive local action. The back of the other electrode, as of magnesium, can be adhered over its entire area to the silver chloride wafer. The resulting very compact construction is used to best advantage with the highly active silver chloride-magnesium couple but is similarly effective with other couples.

A further feature of the invention resides in the provision of a casing that is at once proof against attack by moisture, yet is of such form as to facilitate activation. The casing is applied in fluid form so as to become bonded to the edges of the electrodes and incidentally to the edges of the electrode separators. One peripheral point of each of the separators is preserved free of coating and at that point the edges of the back-to-back electrodes are coated, in a preliminary operation, with a waterproof insulating compound to prevent local cell action. The entire construction has excellent resistance to rough use.

The nature of the invention, together with further features of novelty, will be better appreciated from the following detailed description of an illustrative embodiment shown in the accompanying drawings, in which.

Figure 1:
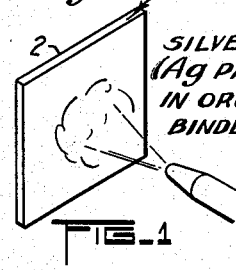
Figs. 1 and 2 illustrate preliminary treatment of a wafer of fused and rolled silver chloride.

In Fig. 1 a wafer 2 of silver chloride is shown during application of an electrically conductive coating in intimate contact with all parts of the wafer. This wafer is formed of fused silver chloride that is flattened as by rolling. Silver chloride normally has a specific resistivity of the order of several megohms; and despite a thickness of the order of 0.010 inch, the resistance of the wafer is too high for unprepared use in a battery. Good conductivity is achieved in the present instance by coating the wafer with a film of conductive paint. The composition of this paint may include, for example, 42% of extremely fine silver particles, 10.8% ethyl cellulose (binder) and 47.2% butyl acetate (solvent). The paint is advantageously applied by an air spray gun as illustrated in Fig. 1.

Figure 2:
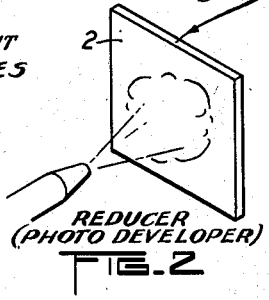
Figure 3:
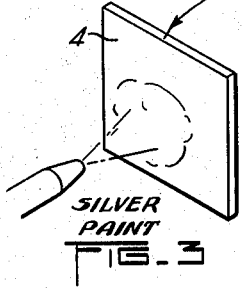
Fig. 3 illustrates a preliminary treatment of a magnesium wafer.

The opposite face of the rolled and fused silver chloride foil is treated with a reducing bath to provide exposed metallic silver in contact with the silver chloride, thereby to speed the start of cell action after activation. A photographic developer such as the well-known D-72 formula is suitable for this purpose, and is conveniently sprayed on, as illustrated in Fig. 2, followed by thorough washing for removal of water-soluble salts.

The magnesium wafer 4 constituting the opposite electrode of the cell is coated with silver paint as by a spray gun, and, before drying, the coated face of the magnesium is brought into contact with the silver-painted face of the silver chloride wafer. The assembled silver chloride and magnesium wafers are then moderately baked to drive off the solvent and any water that may be present.

It is apparent that silver chloride and magnesium in contact with each other form a destructive combination in the presence of moisture because of the wide separation of silver and the magnesium in the electro-chemical series. The silver paint not only acts as an effective intimate connector for the back face of the silver chloride wafer, and as an adhesive between the silver chloride and magnesium that is an aid during further assembly of the battery, but functions well for the purpose of insuring against local action between the two wafers by excluding water vapor and electrolyte, during storage and after activation.

Figure 4:
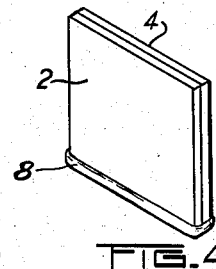
Fig. 4 illustrates a further stage of the treatment, a magnesium wafer and a silver chloride wafer having been adhered together and having had one edge coated.

In order to insure further against local action, the edges of the laminated magnesium and silver chloride wafers 4 and 2 are also coated, except that with the present form of cell it is not necessary as a preliminary operation to coat more than one of the edges, the others being later coated by the battery case. All areas of the wafers are protectively coated except the surfaces that are later to be exposed to electrolyte. In Fig. 4 one edge 8 of the magnesium-silver chloride assembly is shown coated with "Glyptal" or a high melting-point wax or any other suitable adherent insulating compound, applied by dipping, after which the unit is baked to drive off volatile constituents and promote intimate and uniform bonding of this coating.

Figure 5:
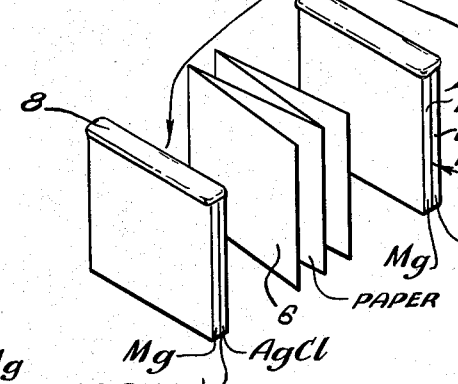
Fig. 5 is an exploded view of a single cell that is to form part of a battery.

Multiple laminated wafers as in Fig. 4 are stacked with an intervening bibulous separator 6 as of folded blotting paper, in the manner indicated in Fig. 5. When a sufficient number of cells have been assembled, end wafers 10 as of cardboard are applied having terminal strips 12 as of nickel in contact with magnesium surfaces exposed at the ends of the stacked electrodes and separators. At one end of the stack, a wafer of magnesium is used alone while at the other end, the usual laminated magnesium and silver chloride wafer is used. Wire leads 14 which are connected to strips 12 are also provided for furnishing flexible battery terminals. The assembled stack is then subjected to moderate pressure and is bound by cords 16 preparatory to application of the battery case. A cardboard strip 18 is applied from end to end in contact with portions 8a of the "Glyptal" coated edges of the cell electrodes.

Figure 6:
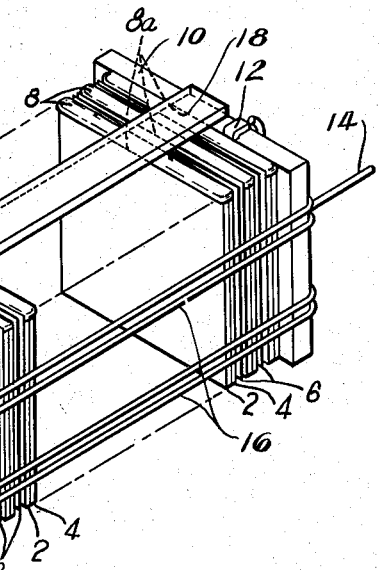
Fig. 6 illustrates the assembled battery in incomplete state.

The battery case can then be provided in several ways. Dipping the assembly of Fig. 6 into a bath of heated wax is poor practice for several reasons. If the wax is too viscous there is poor adhesion with the result that destruction of the battery by exposure to atmosphere should be anticipated. With a sufficiently fluid wax bath to assure adhesion, the wax tends to penetrate into the bibulous separators, thereby decreasing the effective cross-section of the cells.

One recommended practice is to cast the battery in a thermoplastic elastomer. After thus encasing the battery, it is advisable to bake it to drive off water vapor and solvents, the time and temperature depending on the particular material but being otherwise not critical. Alternatively, a fusible insulating material such as polyethylene can be flame-sprayed to provide an effective battery case, preferably first baking the assembly of Fig. 6. In both procedures, a very tight unit is produced free and proof against destructive moisture; yet strip 18 is encased in readiness to bare the bibulous separators for activation.

Figure 7:
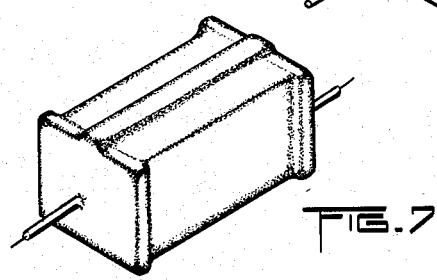
Fig. 7 illustrates the completed battery in condition for storage.

The completed cell can be stored in the state shown in Fig. 7 for a great length of time without deteriorating. When it is ready for use an incision is made to allow strip 18 to be peeled from the battery. Following this preparation, which exposes the protectively coated edges 8 of the electrodes and the clean edges of the bibulous separators, the entire cell is soaked in water, salt water, or any desired electrolyte. In this condition the battery will operate for several hours, the exact length of time depending on the current drain. Before activation, it will of course be understood that the bibulous separators must be dry.

The chemical process of cell action involves the magnesium and the silver chloride, in addition to the electrolyte. The silver paint is chemically inert, serving as an electrical connector or terminal, and as a waterproof filler and adhesive between the magnesium and the silver chloride wafers. The stack of wafers, the flat form of the wafers and the fused and flattened silver chloride contribute to impart excellent resistance to shock and vibration, during storage and in use.

Various detailed changes in the foregoing may be regarded advisable by those practicing certain aspects of the invention. For example, in place of the silver paint or in addition thereto it may be considered desirable to establish contact with the back surface of the silver chloride wafer by means of a film of reduced silver. A chemically produced metallic backing on the silver chloride serves to provide an intimate electrical connection and thereby to reduce the internal resistance of the battery. Omission of the silver paint in favor of the reduced silver backing introduces the mechanical difficulty of establishing connection to the magnesium foil, and further raises the possibility of local action due to the air spaces between the electrodes. The edge-coating of the assembled silver chloride and magnesium wafers would tend to prevent unintended activation between adjacent layers when the separators are to be soaked in electrolyte.

While the active materials used in the illustrative cell are magnesium and silver chloride, many of the novel features of the invention will be recognized as of a mechanical nature. The same form of construction can be used to advantage when electrode materials other than those illustrated are desired. Because of the latitude of substitution and detailed deviation, it is appropriate that the appended claims be given broad interpretation consistent with the spirit and scope of the invention.

What is claimed is:

1. A deferred action battery comprising a stack of cells having substantially coextensive planar electrodes of opposite polarity in back-to-back relation, the adjoining electrodes of adjacent cells being connected to each other by waterproof conductive paint over substantially their full extent and having their edges coated about the full periphery with waterproof insulation, and an unactivated bibulous separator between the electrodes of each cell having an insulating waterproof edge coating extending along less than the full periphery thereof.

2. A battery comprising a stacked series of magnesium wafers and silver chloride wafers, alternately spaced apart by a bibulous separator and joined together by a film of silver particles in an organic binder.

3. A battery comprising a wafer of a metal higher than silver in the electrochemical series having intimate electrical contact with a wafer of fused silver chloride, said contact comprising a suspension of metallic particles in a waterproof organic binder.

4. A battery comprising a magnesium wafer, a fused and rolled wafer of silver chloride, said latter wafer having an intimate metallic silver coating in overall contact with said magnesium wafer, and a waterproof coating extending about the full periphery of said wafers.

5. A battery comprising a stack of laminar electrodes, and dry bibulous separators between paired electrodes, said paired electrodes being electrically connected together, a removable strip extending across an edge of each of the electrodes and the separators, and a waterproof casing in intimate watertight contact with the edges of said electrodes and enclosing said strip and said bibulous separators, said electrodes having their edge portions covered by insulation in the region of said strip and said bibulous separators being exposed to said strip, whereby activity of the battery is deferred despite atmospheric moisture until said strip is removed to expose edge portions of said bibulous wafers for introduction of electrolyte without exposing the edges of said electrodes to the electrolyte.

6. A deferred-action battery having a stack of cells wherein each cell includes a pair of electrodes spaced apart by a bibulous separator, the adjoining electrodes of adjacent cells being physically and electrically connected to each other by a moisture-proof electrically conductive cement forming a portion of a moisture-proof casing about each cell, moisture-proof insulation about the full periphery of the edges of said electrodes forming an additional portion of the moisture-proof casing about each cell, and moisture-proof material about the entire periphery of said separators adherent to said insulation about said electrode edges continuing the moisture-proof casin about each cell, said moisture-proof material being out of contact with said separators at aligned areas along the battery for exposing each separator of the battery when charging with fluid.

7. A deferred-action battery according to claim 6, wherein a strip of material overlies said spots and said casing encloses said strip, whereby said bibulous separators can be exposed for charging by removal of said strip.

8. A battery having a stack of cells each including, in the order named, a plate of one metal, a bibulous separator, and a thin layer of a salt of another metal lower than that of said plate in the electrochemical series, said cells being stacked with a waterproof conducting film adhered to the respective adjacent metal plates and salt layers, the edges of said adhered plates and layers being protected by adherent waterproof insulation about the periphery thereof.

9. A battery having a stack of cells, each cell including a wafer of silver chloride, a bibulous separator, and an electrode of a metal higher than silver in the electrochemical series, all arranged in contact in the order named, and a waterproof conductive film adhered to the metal electrode of each cell and the silver chloride wafer of the next cell.

10. A battery subassembly for fabrication into a multi-cell battery including a magnesium wafer, a fused and rolled wafer of silver chloride, said wafer having an intimate metallic silver coating in over-all contact with said magnesium wafer, and a waterproof coating along one edge of said magnesium and silver chloride wafers.

11. A deferred-action battery including a stack of cells each having a dry bibulous separator between a pair of planar electrodes of opposite polarity, the electrodes of adjacent cells being joined to each other by a moisture-proof conductive paint including metal particles in an organic binder, a casing adhered to the edges of the electrodes and to the separators at all peripheral points excepting a zone extending from end to end of the battery, the edges of the adjacent stacked electrodes being coated with moisture-proof electrical insulation in said zone, and a strip of readily removable material overlying said zone, said casing enclosing said strip, whereby said bibulous separators can be exposed for charging with fluid by breaching the casing and removing said strip.

JAMES N. DAVIS.

REFERENCES CITED

The following references are of record in the file of this patent:

UNITED STATES PATENTS

| Number | Name | Date |
|---|---|---|
| 403,451 | Barrett | May 14, 1889 |
| 1,624,455 | Yngve | Apr. 12, 1927 |
| 1,797,161 | Strohl et al. | Mar. 17, 1931 |
| 2,146,377 | MacCallum | Feb. 7, 1939 |
| 2,444,034 | Collings et al. | June 29, 1948 |
| 2,475,152 | Rock | July 5, 1949 |
| 2,487,985 | Ruben | Nov. 15, 1949 |

FOREIGN PATENTS

| Number | Country | Date |
|---|---|---|
| 482,363 | Great Britain | Mar. 24, 1938 |
| 495,054 | Great Britain | Nov. 7, 1938 |
| 668,569 | France | July 15, 1929 |
| 784,460 | France | Apr. 29, 1935 |